United States Patent
Milesi et al.

(12) 
(10) Patent No.: US 6,386,340 B1
(45) Date of Patent: May 14, 2002

(54) MOTORCYCLE WHEEL BRAKE MECHANISM

(76) Inventors: Giorgio Milesi, 5788 Dawson Ave., Goleta, CA (US) 93117; Umberto Milesi, c/Balmer 203; Alfredo Milesi, c/Buenos Aires 12/7, both of Barcelona (ES)

( * ) Notice: Subject to any disclaimer, the term of this patent is extended or adjusted under 35 U.S.C. 154(b) by 0 days.

(21) Appl. No.: 09/490,042

(22) Filed: Jan. 24, 2000

(51) Int. Cl.⁷ ............................................. F16D 65/10
(52) U.S. Cl. ............... 188/218 XL; 188/17; 188/264 R
(58) Field of Search .................. 188/17, 18 R, 188/18 A, 26, 218 XL, 264 A, 264 R, 264 D; D12/180

(56) References Cited

U.S. PATENT DOCUMENTS

| | | | |
|---|---|---|---|
| 2,533,480 A | * 12/1950 | Leininger et al. ..... | 188/218 XL |
| 2,850,118 A | * 9/1958 | Byers ..................... | 188/264 A |
| 2,987,143 A | * 6/1961 | Culbertson et al. ..... | 188/264 A |
| 3,081,842 A | * 3/1963 | Zindler et al. ......... | 188/218 XL |
| 4,848,521 A | * 7/1989 | Izumine ................... | 188/18 A |
| 5,358,086 A | * 10/1994 | Muller et al. ......... | 188/218 XL |
| 5,850,895 A | * 12/1998 | Evrard ................... | 188/264 A |
| 6,164,421 A | * 12/2000 | Nakamura et al. ......... | 188/71.5 |

FOREIGN PATENT DOCUMENTS

WO    WO 00/50109    * 10/1999

* cited by examiner

*Primary Examiner*—Robert J. Oberleitner
*Assistant Examiner*—Thomas J. Williams
(74) *Attorney, Agent, or Firm*—Erik M. Arnhem

(57) ABSTRACT

A brake disc for a wheel constituted by a peripheral section, forming a brake band with an interior form enabling it to be fitted to its wheel, the brake band forms two lateral flat and parallel surfaces on which a brake shoe can act, said peripheral section having a series of off-sets on its inside and outside edges.

1 Claim, 1 Drawing Sheet

MOTORCYCLE WHEEL BRAKE MECHANISM

OBJECT OF THE INVENTION

As its title suggests, this invention refers to a brake disc for motorcycles or the like, with a series of constructional features on the peripheral part forming the brake band.

BACKGROUND TO THE INVENTION

Motorcycle brake discs generally have an external section which is ring-shaped, flat, and not very thick, on which the brake shoes operate; this external section forms the brake band. Said discs also have an interior form designed to allow them to be fixed on to the wheel. This interior form and the exterior section may be a monobloc unit or may be joined in such as way as to permit expansion of the outer section so that it will not become deformed when it heats.

One of the problems of such discs arises precisely from the heating they experience during braking so that, normally, the exterior part has a number of openings through it to facilitate cooling.

On so-called road motorcycles, the discs reach very high temperatures because of the speeds involved, so that the openings in the brake discs are important in facilitating cooling, should water get into these openings, it evaporates virtually instantly thanks to the high temperature of the disc.

However, on cross and trial motorcycles, these openings have advantages in terms of reduced weight, but they do have significant drawbacks when mud gets into them since it is unable to be released because the disc turns at a much slower speed than on road motorcycles.

A DESCRIPTION OF THE INVENTION

To overcome these problems, particularly on cross and trial motorcycles, the brake disc which is the subject of this invention has been designed with a number of constructional features on the peripheral section forming the brake band. These discs are preferably constructed by laser cutting, made from a high carbon stainless steel mixed material, based on 420 stainless steel materials.

In this invention, said peripheral part of the disc does not have inside holes, so that the problem of the accumulation and retention of mud inside them is overcome; said peripheral section also has a series of off-sets on its inside and outside edges of the same thickness as the rest of the section so as to reduce the total weight of the disc, facilitate its cooling and prevent mud from being retained inside.

Said off-sets on the inside and outside edges of the peripheral section of the disc are preferably arranged alternately so that the width of said section is substantially constant. As a result, during braking the contact surface of the brake band with the shoes hardly alters with the rotation of the disc; otherwise, braking may be intermittent and may vary according to the area of contact between disc and shoes.

To ensure uniform distribution of the disc mass, the inside and outside off-sets are distributed evenly on the periphery, in alternating form.

A DESCRIPTION OF THE DRAWINGS

To complete this description and aid in a better understanding of the features of the invention, these Specifications are accompanied by a set of drawings, forming an integral part hereof and where, by way of illustration and without limitation, the following is shown:

A PREFERRED EMBODIMENT OF THE INVENTION

As can be seen from the aforementioned figure, the brake disc which is the subject of the invention comprises the usual peripheral section (1) forming the brake band, with an internal form (2) to enable it to be attached to its wheel.

Figure 1:
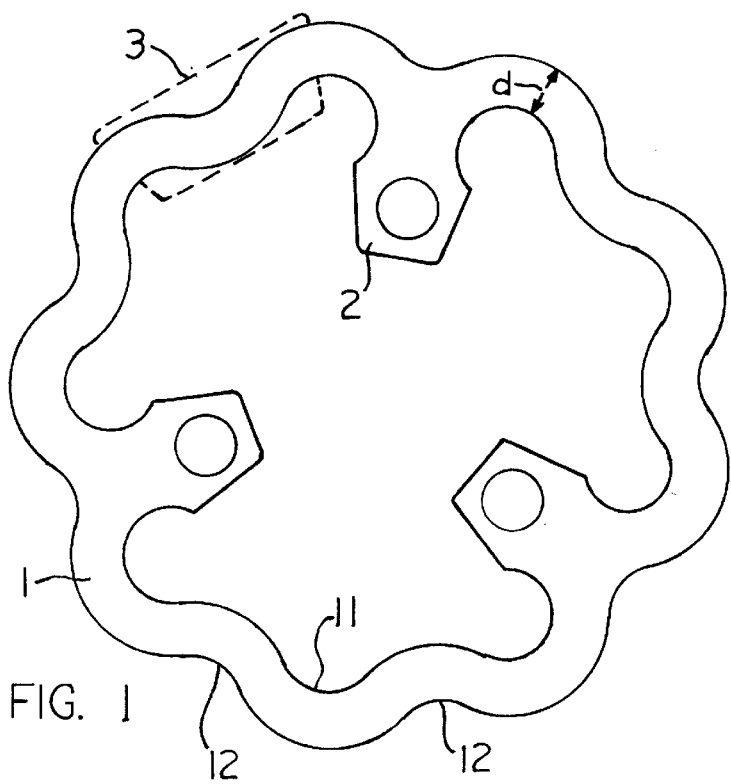
FIG. 1 is an elevated view of a variant of the design for the brake disk which is the subject of the invention, with the running band of sinusoidal form; this figure also shows the outline of one of the brake shoes, with a broken line.

As shown in FIG. 1, said peripheral portion (1) is a single solid block, with off-sets (11 and 12) on its inside and outside edges, distributed along those edges, and displaced at an angle to each other, so that the inside off-sets (11) are in the area between two consecutive outside off-sets (12); as a result, said peripheral section (1) is substantially the same width (d) throughout its length.

This constant width of the section (1) ensures that, during braking, the contact area between said section (1) and the brake shoes or pads (3) is constant; otherwise, braking might be intermittent, precisely because of the variations in the area of contact between the two elements.

The arrangement of the inside off-set (11) and their outside counterparts (12) not just helps to cool the disc, but also prevents mud or other elements which might negatively affect braking from accumulating on it.

Figure 2:
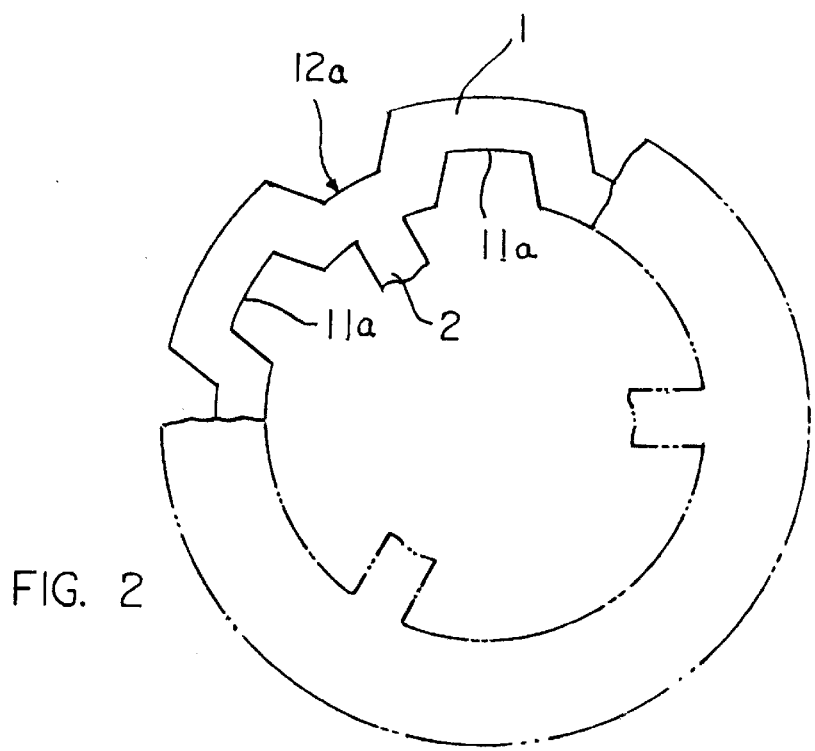
FIG. 2 shows a design variant partially showing the peripheral section of the disc, in this case with substantially trapezoid-shaped off-sets.

As the figures show, the inside and outside off-sets (11 and 12) may be rounded, with section (1) taking on a sinusoidal form as in FIG. 1; or they may have different shapes as in the design variant in FIG. 2 where the off-sets (11a and 12a) are substantially trapezoid-shaped.

It will be noted that the inner and outer edges of brake disc 1 have endless circular wave shapes concentric around the disc rotational axis. Each wave—shaped edge comprises recurring wave peaks and valleys spaced different radial distances from the disc rotational axis. The peaks on the outer wave—shaped edge are located on a first imaginary circumferential line that passes across the outer edge of each brake pad 3. The valleys on the inner wave—shaped edge are located on the secondary imaginary circumferential line that passes across the inner edge of each brake pad 3. With the illustrated arrangement the brake pad encompasses the outer and inner edges of the brake disc, so that each side surface of the brake disc has maximum engagement with the associated brake pad. As previously noted, the wave—shaped inner and outer edges facilitate turbulent air cooling of the brake disc, without tending to accumulate mud debris on the friction surfaces.

It is not considered necessary to extend this description in order for any expert in the field to understand the scope of the invention and the advantages arising from it.

The terms of these Specifications must be taken always in the broad sense, without limitation.

The materials, shape, size and layout of the elements may be changed provided that this does not involve an alteration to the essential characteristics of the invention, claimed below.

What is claimed is:

1. A motorcycle wheel brake mechanism comprising:
   a brake disc attachable to a motorcycle wheel, and
   a brake pad assembly carried by the motorcycle frame for frictional engagement with said brake disc;

said brake disc having two flat uninterrupted annular side surfaces, an inner edge connecting said flat side surfaces, an outer peripheral edge connecting said flat side surfaces, and mounting elements (2) extending from said inner edge for locating said brake disc in an exposed position on a motorcycle wheel;

said brake pad assembly comprising opposed brake pads (3) located along the rotational path of said brake disc for pressurized frictional contact with said flat side surfaces;

said brake disc having a rotational axis coincident with the wheel rotational axis;

the outer edge of said brake disc having an endless circular wave shape concentric around the disc rotational axis; said outer wave—shaped edge comprising recurring wave peaks and valleys spaced different radial distances from the disc rotational axis, said peaks being located on a first imaginary outer circumferential line centered on the disc rotational axis;

the inner edge of said brake disc having a circular wave shape concentric around the disc rotational axis, said inner wave—shaped edge comprising recurring wave peaks and valleys spaced different radial distances from the disc rotational axis, the recurring valleys on said inner edge being located on a second imaginary circumferential line centered on the disc rotational axis;

each said brake pad having a radial dimension that is substantially the same as the radial spacing between the first and second imaginary circumferential lines, whereby the brake pads encompass the outer and inner edges of the brake disc.

* * * * *